United States Patent [19]

Sakai

[11] Patent Number: 5,075,864
[45] Date of Patent: Dec. 24, 1991

[54] SPEED AND DIRECTION SENSING APPARATUS FOR A VEHICLE

[75] Inventor: Izumi Sakai, Solihull, Great Britain

[73] Assignee: Lucas Industries Public Limited Company, Birmingham, England

[21] Appl. No.: 414,147

[22] Filed: Sep. 28, 1989

[30] Foreign Application Priority Data

Oct. 3, 1988 [GB] United Kingdom ............... 8813179
Dec. 22, 1988 [GB] United Kingdom ............... 8829906

[51] Int. Cl.$^5$ .............................................. G06F 15/50
[52] U.S. Cl. ................................. 364/450; 364/424.01;
  364/565; 356/28; 342/17
[58] Field of Search ............... 356/28; 324/160, 163,
  324/165; 364/565, 450, 424.01; 342/117

[56] References Cited

U.S. PATENT DOCUMENTS

| | | | |
|---|---|---|---|
| 4,283,138 | 8/1981 | Lai | 356/28 |
| 4,329,047 | 5/1982 | Kikuchi et al. | 356/28 |
| 4,414,548 | 11/1983 | Carpenter et al. | 324/160 |
| 4,495,589 | 1/1985 | Hirzel | 364/565 |

FOREIGN PATENT DOCUMENTS 0081572 5/1984 Japan .................................. 324/160

Primary Examiner—Thomas G. Black
Attorney, Agent, or Firm—Nixon & Vanderhye

[57] ABSTRACT

An apparatus is provided for determining the velocity and orientation of a vehicle, for instance to permit route guidance by dead reckoning. Two optical speed over ground sensors on the vehicle are arranged at acute angles to the longitudinal axis of the vehicle. One or more further sensors, such as a fibre optic gyroscope or one or two optical speed over ground sensors, are provided on the vehicle. The speed and direction from these sensors can be used by a data processor to perform dead reckoning navigation and the vehicle position can thus be determined.

10 Claims, 6 Drawing Sheets

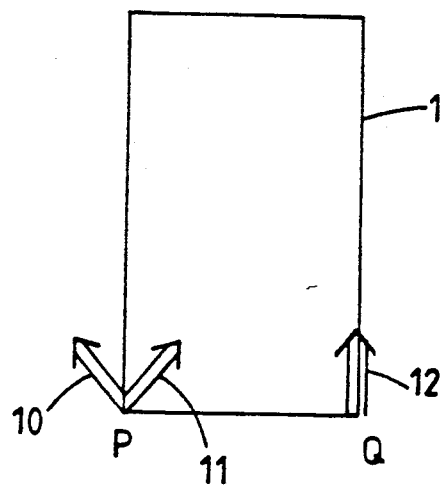
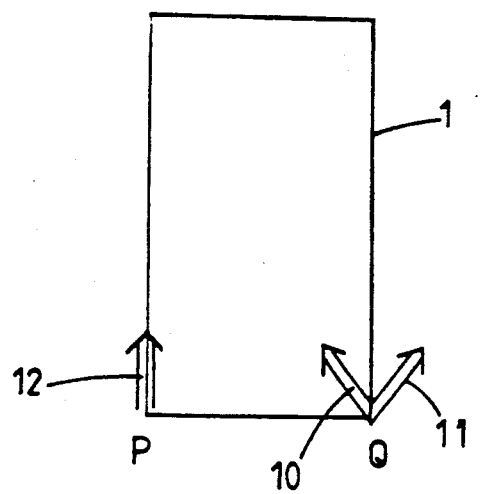
FIG. 6a   FIG. 6b
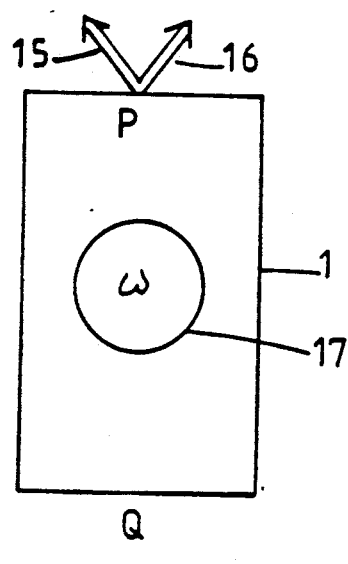
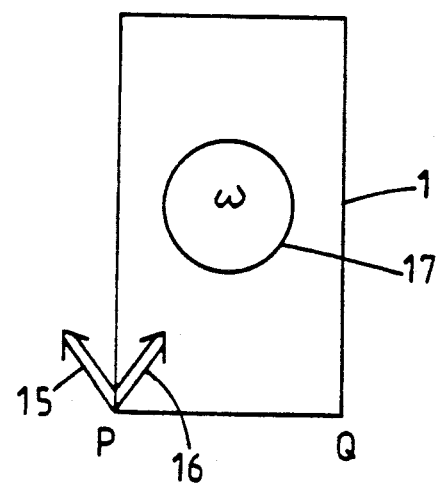
FIG. 7a   FIG. 7b

SPEED AND DIRECTION SENSING APPARATUS FOR A VEHICLE

BACKGROUND OF THE INVENTION

Field of the Invention

The present invention relates to an apparatus for sensing the speed and direction over the ground of a vehicle. Such an apparatus may be used as part of a dead reckoning system, for instance for route guidance.

SSUMMARY OF THE INVENTION

According to a first aspect of the invention, there is provided an apparatus for sensing the vector velocity of a point on a vehicle with respect to the ground, comprising first and second speed over ground sensors, each of which is sensitive to speed in a preferred sensing orientation and to the direction of movement in the preferred sensing orientation, the speed over ground sensors being arranged at the point on the vehicle such that the preferred sensing orientations are aligned in different directions with respect to each other.

According to a second aspect of the invention, there is provided an apparatus for sensing the velocity and orientation of a vehicle with respect to the ground, comprising: first and second speed over ground sensors, each of which is sensitive to speed in a preferred sensing orientation and to the direction of movement in the preferred sensing orientation, the speed over ground sensors being arranged on the vehicle such that the preferred sensing orientations are aligned in different directions with respect to each other; and at least one further vehicle movement sensor.

The expression "direction of movement in the preferred sensing orientation" means that the sensor is sensitive to whether the movement is "positive" or "negative" as opposed to indicating the angle which the velocity vector makes with the preferred sensing orientation.

Although Doppler speed over ground sensors, for instance using microwaves or ultrasound, may be used, the speed over ground sensors are preferably optical speed over ground sensors which are mountable on a vehicle to receive light reflected from the gournd and which each provide a signal representing the speed and direction or "polarity" of movement of the sensor with respect to the ground in a preferred sensing orientation. An example of such a sensor has a photoelectric transducer located behind a spatial filter which in turn is located behind a converging lens. The spatial filter comprises an optical grating having a plurality of parallel slits. The preferred sensing orientation of such a sensor is perpendicular to the parallel slits. The spatial filter can also be realized by using a photodector array, of which the alternate photodetector elements are combined together to form at least two groups, the difference between the two output signals (of the two groups) is taken by a differential amplifier. Optical speed over ground sensors of this type are intended for use with their preferred sensing orientations aligned parallel to the direction of movement of the sensor with respect to the ground. However, such sensors provide useful output signals when their preferred sensing orientations form an angle with the direction of movement of up to about 40°.

Preferably there is one further vehicle movement sensor comprising either a rotation sensor, such as a fibre optic gyroscope, sensitive to rotation about an axis perpendicular to the ground or a third optical speed over ground sensor. In either case, the first and second optical sensors are preferably located adjacent each other with their preferred sensing orietations aligned at respectively small angles on either side of the longitudinal axis of the vehicle, the longitudinal axis of the vehicle being the direction of movement of the vehicle relative to the ground when all steered wheels are at zero steering angle. The respective small angles are preferably equal to each other, preferably less than 40°, and most preferably substantially equal to 20°.

In the case of three optical speed over ground sensors, the third optical sensor is preferably spaced from the first and second sensors with its preferred sensing orientation aligned substantially parallel to the longitudinal axis of the vehicle. Preferably, the third optical sensor is spaced laterally from the first and second optical sensors.

Although three sensors are sufficient to define the velocity and orietation of the vehicle with respect to the ground, there may be circumstances in which it is preferable to provide more sensors, for instance four optical speed over ground sensors. In this case, the optical sensors may be arranged as two spaced apart pairs of sensors, each pair preferably being arranged as hereinbefore described for the first and second optical sensors when only three sensors are provided. The two pairs of optical sensors may be spaced apart laterally or longitudinally of the vehicle.

According to a third aspect of the invention, there is provided a dead reckoning system for a vehicle including an apparatus according to the second aspect of the invention.

Preferably, the dead reckoning system includes processing means for periodically updating an estimated current position of the vehicle on the basis of an estimated previous position, the velocity and orietation of the vehicle sensed by the sensing apparatus, and the time interval since the previous position was estimated. Preferably, the processing means is arranged to convert the output signals of the sensors representing the speed and direction of the vehicle into the velocity of the vehicle with respect to the ground. According to a fourth aspect of the invention, there is provided a vehicle including an apparatus according to the first or second aspect of the invention, and preferably including a dead reckoning system according to the third aspect of the invention.

BRIEF DESCRIPTION OF THE DRAWING

The invention will be further described, by way of example, with reference to the accompanying drawings, in which:

FIGS. 5a to 7b are diagrammatic plan views illustrating practical embodiments of the invention;

DETAILED DISCUSSION OF PREFERRED EMBODIMENTS

Figure 1:
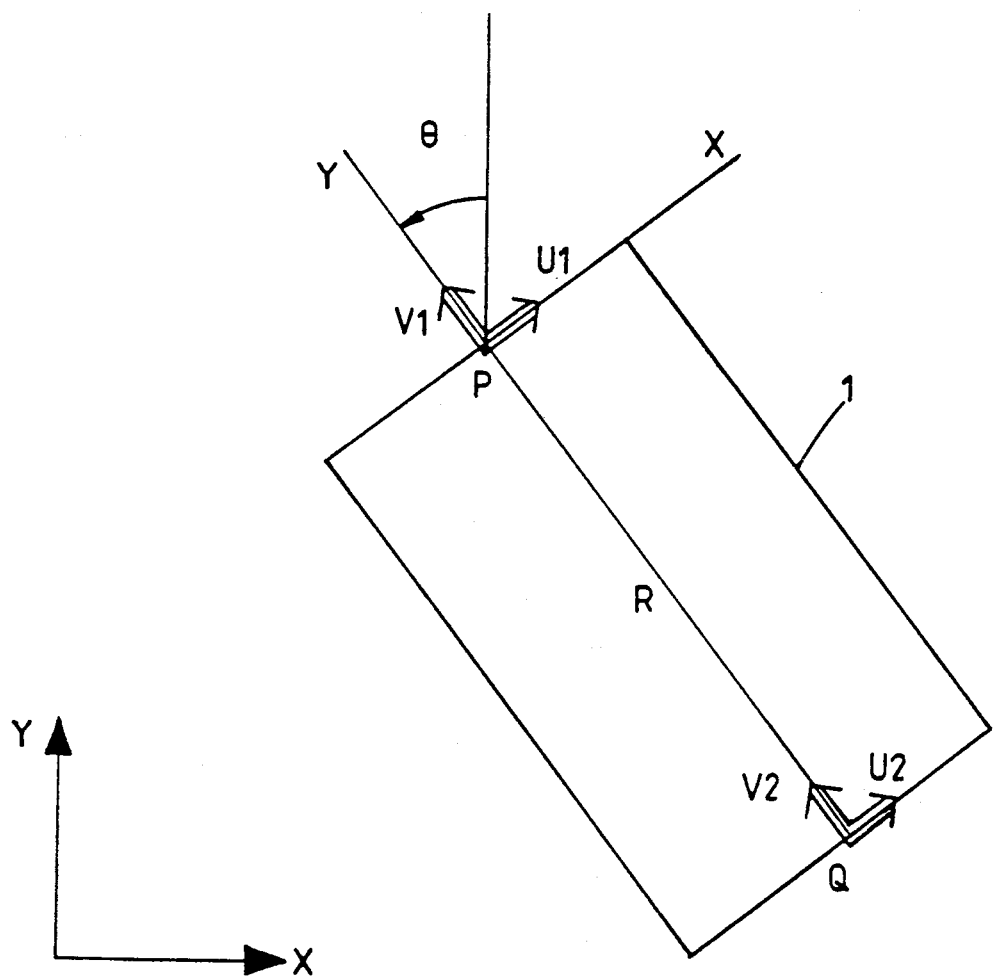
FIG. 1 is a diagrammatic plan view illustrating a vehicle and co-ordinate systems.

First of all, the parameters and terminology in a vehicle movement system will be described with reference to FIG. 1.

A vehicle 1 is assumed to be a two-dimensional object restrained on a ground surface and moving two-dimensionally. The position and the attitude of the vehicle is well defined by the positions of any two points P and Q on the vehicle. With respect to a geographical coordinate system (x,y) fixed on the ground, the positions of the two points are given as P $(x_1, y_1)$ and Q $(x_2, y_2)$. The distance R between the two points remains constant whatever the movement, so that:

$$(X_1 - x_2)^2 + (Y_1 - Y_2)^2 = R^2 \tag{1}$$

The two points P and Q can be chosen arbitrarily. For example, the point P may be on the front centre and point Q on the rear centre of the vehicle as shown in FIG. 1. Then the angle $\theta(-\pi < \theta < \pi)$ between the line connecting the two points P and Q and the y axis of the geographical coordinate system indicates the 'heading' of the vehicle with reference to the y axis. Using the distance R and the heading $\theta$:

$$x_1 - x_2 = -R \sin \theta \tag{2}$$

$$Y_1 - Y_2 = R \cos \theta \tag{3}$$

Alternatively, the point P may be chosen to be on the left rear corner and the point Q on the right rear corner of the vehicle 1. In this case, the angle $\theta$ indicates the heading of the vehicle with reference to the x axis. Whatever the choice of the points, the equations (2) and (3) apply although the interpretation of the angle $\theta$ may vary.

The purpose of a dead reckoning system is to determine the vehicle movement in the geographical coordinate system using sensors mounted on the vehicle without referring to external information. Each sensor mounted on the vehicle may be of a type which enables one-dimensional speed measurement with respect to the ground surface. Thus, a pair of sensors at point P arranged to have measurement directions perpendicular to each other provides two-dimensional speed or 'vector velocity' measurement. Another such pair is fixed at point Q in a similar way. The vector velocities measured in such a manner are not given according to the geographical coordinate system but to a vehicle coordinate system (X,Y) with the origin at point P and the Y axis along the line PQ.

In order to provide "map matching", the dead reckoning system may be arranged to receive information from an external source, for instance vehicle position data. This may be used to confirm or correct position data determined by the dead reckoning system so as to prevent errors from accumulating. Such information may be supplied from satellite or ground based navigation systems.

Given the head of the vehicle $\theta$, conversion between the vector velocities $(U_1, V_1)$ at the point P and $(U_2, V_2)$ at the point Q in the vehicle coordinate system and the vector velocities $(u_1, v_1)$ at the point P and $(u_2, v_2)$ at the point Q in the geographical coordinate system can be made as follows:

$$u_k = U_k \cos \theta - V_k \sin \theta \quad k = 1, 2 \tag{4}$$

$$v_k = U_k \sin \theta + V_k \cos \theta \quad k = 1, 2 \tag{5}$$

Given the present positions of P $(x_{1,i}, y_{1,i})$ and Q $(x_{2,i}, y_{2,i})$, and the present velocities $(U_{1,i}, V_{1,i})$ and $(U_{2,i}, V_{2,i})$, it is possible to estimate the next positions P $(x_{1,i+1}, y_{1,i+1})$ and Q $(x_{2,i+1}, y_{2,i+1})$, where the subscript i is employed to denote the time sequence. An algorithm for this comprises the following steps:

1) Set the intial positions P $(x_{1,0}, y_{1,0})$ and Q $(x_{2,0}, y_{2,0})$ and the initial heading $\theta_0$. For instance, $$x_{1,0} = x_{2,0} = y_{1,0} = 0 \tag{6}$$

$$y_{2,0} = -R \tag{7}$$

$$\theta_0 = 0 \tag{8}$$

2) At time $t_i$, measure the vector velocity $(U_{1,i}, V_{1,i})$ at point P and $(U_{2,i}, V_{2,i})$ at point Q.

3) Convert the vector velocity $(U_{k,i}, V_{k,i})$ (where k = 1, 2) from the vehicle coordinate system to the geographical coordinate system, using the following:

$$u_{k,i} = U_{k,i} \cos \theta_i - V_{k,i} \sin \theta_i \quad k = 1, 2 \tag{9}$$

$$v_{k,i} = U_{k,i} \sin \theta_i + V_{k,i} \cos \theta_i \quad k = 1, 2 \tag{10}$$

4) Estimate the next positions $(x_{k,i+1}, Y_{k,i+1})$ (where k = 1, 2) after a time interval dt, using the present positions $(x_{k,i}, Y_{k,i})$ and the present vector velocities $(u_{k,i}, v_{k,i})$ (k = 1, 2), as follows:

$$x_{k,i+1} = x_{k,i} + u_{k,i} dt \quad k = 1, 2 \tag{11}$$

$$Y_{k,i+1} = Y_{k,i} + v_{k,i} dt \quad k = 1, 2 \tag{12}$$

5) Estimate the next heading $\theta_{i+1}$, using the estimated next positions, as follows:

If $y_{1,i+1} > y_{2,i+1}$, then $-\pi/2 < \theta_{i+1} < \pi/2$ and
$$\theta_{i+1} = -\arctan[(x_{1,i+1} - x_{2,i+1})/(y_{1,i+1} - y_{2,i+1})] \tag{13}$$

If $y_{1,i+1} \leq y_{2,i+1}$ and $x_{1,i+1} \geq x_{2,i+1}$,
then $-\pi \leq \theta_{i+1} \leq -\pi/2$ and
$$\theta_{i+1} = -\pi - \arctan[(x_{1,i+1} - x_{2,i+1})/y_{1,i+1} - y_{2,i+1})] \tag{14}$$

If $y_{1,i+1} \leq y_{2,i+1}$ and $x_{1,i+1} \leq x_{2,i+1}$,
then $\pi/2 \leq \theta_{i+1} \leq \pi$ and
$$\theta_{i+1} = \pi - \arctan[(x_{1,i+1} - x_{2,i+1})/(y_{1,i+1} - y_{2,i+1})] \tag{15}$$

6) Set the next measurement time $t_{i+1}$ as $$t_{i+1} = t_i + dt \tag{16}$$

Steps (2) to (6) are then cyclically repeated.

So far, it has been assumed that two pairs of sensors should be used at two points on a vehicle to realise a dead reckoning system. However, it is not essential to use four sensors. Because of the number of degrees of freedom of the vehicle movement, the number of sensors can be reduced from four to three.

The first derivative with respect to time of equation (1) gives:

$$(x_1 - x_2)(u_1 - u_2) + (Y_1 - Y_2)(v_1 - v_2) = 0 \tag{17}$$

Figure 2A:
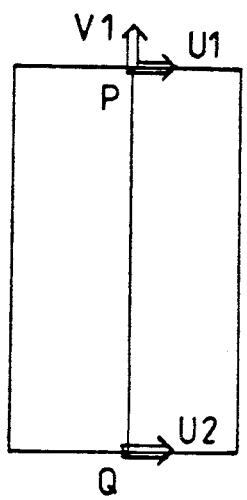
FIGS. 2a, 2b, 3a, 3b, 3c and 3d illustrate various theoretical implementations of the invention.
Figure 2B:
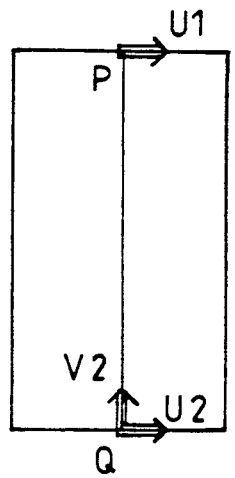
Figure 3A:
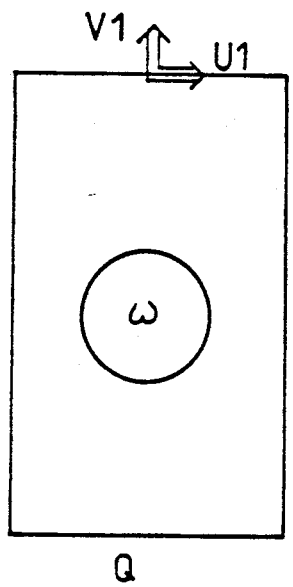
Figure 3B:
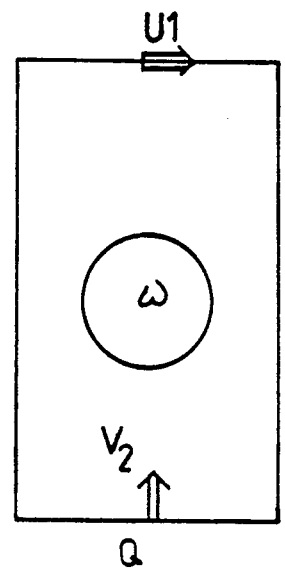
Figure 3C:
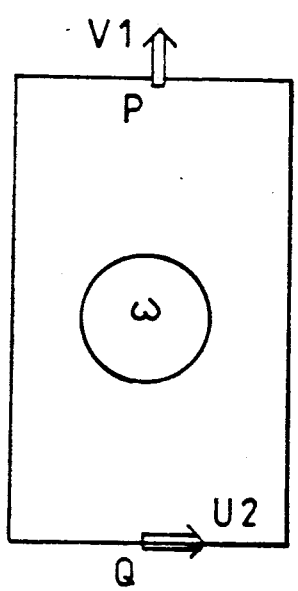
Figure 3D:
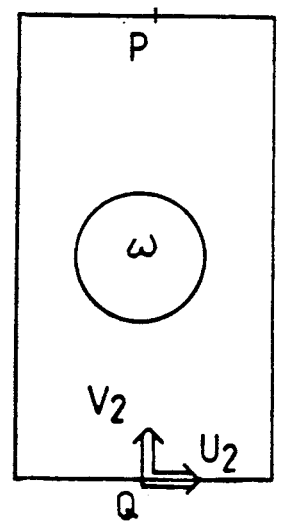

Combining equations (2), (3), (4), (5) and (17) gives:

$$V_2 = V_1 \tag{18}$$

which means that the two points have the same speed in the direction of the Y axis. Thus, of the four speeds $U_1$, $U_2$, $V_1$ and $V_2$, only three are independent. Therefore, the measurement of either a) $U_1$, $U_2$ and $V_1$ or b) $U_1$, $U_2$ and $V_2$ would be sufficient to perform the above algorithm. FIGS. 2a and 2b show such two possible configurations.

Another possible arrangement uses a combination of sensors for one-dimensional speed measurement and a sensor responsive to rotation of the vehicle about an axis perpendicular to the ground, such as a fibre optic gyro (FOG) sensor mounted on a vehicle giving a direct measurement of the rotation rate $\omega = d\theta/dt$. In this case the first derivatives with respect to time of equations (2) and (3) give:

$$u_1 - u_2 = -R\omega \cos \theta \tag{19}$$

$$v_1 - v_2 = -R\omega \sin \theta \tag{20}$$

By combining equations (4) and (5) with equations (19) and (20):

$$V_1 = V_2 \tag{21}$$

$$U_1 + R\omega = U_2 \tag{22}$$

Therefore, the measurement of either a) $U_1$, $U_2$ and $V_1$ or
b) $U_1$, $U_2$ and $V_2$ or
c) $U_1$, $\omega$ and $V_1$ or
d) $U_1$, $\omega$ and $V_2$ or
e) $U_2$, $\omega$ and $V_1$ or
f) $U_2$, $\omega$ and $V_2$ would be sufficient for dead reckoning. The first two (a) and (b) do not use the rotation sensor and are the same as in the previously described example. FIGS. 3a, 3b, 3c and 3d show the possible configurations for (c) to (f) respectively.

When a rotation sensor such as a FOG sensor is used, the previously described algorithm has to be modified as follows. In step 5), instead of estimating the heading value $\theta$, two unmeasured values of the speeds $U_1$, $U_2$, $V_1$ and $V_2$ are estimated, using the equations (21) and (22).

In the preceding description, it has been assumed that the vector velocities ($U_k$, $V_k$) ($k = 1, 2,$) can be measured directly by having a pair of sensors located at an angle perpendicular to each other, i.e. along X and Y axes on the vehicle. However, it is not in practice possible to use such arrangements when optical speed over ground sensors using the spatial filtering method are used.

The spatial filtering method employed in such sensors relies on high correlation between the signals from photodetector elements, i.e. the fact that the photodetector elements 'see' almost the same piece of the ground as the vehicle travels. This is possible only when the vehicle moves in a direction similar to the orientation of the spatial filter. A spatial filter placed laterally to the main movement direction, therefore, cannot measure the lateral velocity.

Experiments have shown that the quality of the signal output deteriorates as the angle between the direction of the vehicle movement and that of the spatial filter increases. Such deterioration can be reduced by allowing the photodector a wider view in the lateral direction. This is achieved by a cylindrical lens arranged in front of the photodetector. The maximum angle that can give a reasonable signal output with this type of set-up has been found to be about 40 degrees.

Accordingly, instead of having two sensors oriented along the X and Y axes, the sensors are arranged at acute angles with respect to the orientation of a vehicle, i.e. X or Y axis, preferably but not necessarily symmetrically with respect to the orientation.

Figure 4A:
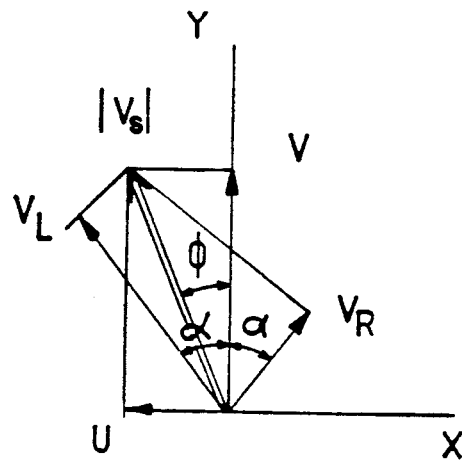
FIGS. 4a and 4b illustrates use of an optical speed over ground sensor.

In a first arrangement, two speed over ground sensors are placed symmetrically i.e. at angles of plus and minus $\alpha$ with the Y axis whilst the vehicle moves approximately in the Y direction. If the point P on the vehicle moves at a speed $|V_s|$ at an angle $\phi$ with respect to the Y axis and the two sensors measure the velocities ($V_L$, $V_R$) along their orietations, as shown in FIG. 4a, then:

$$V_L = |V_s| \cos(\alpha - \phi) \tag{23}$$

$$V_R = |V_s| \cos(\alpha + \phi) \tag{24}$$

The velocities along the X and Y axes (U, V) can also be expressed as $$U = -|V_s| \sin \phi \tag{25}$$

$$V = |V_s| \cos \phi \tag{26}$$

Combining equations (23)–(26), gives:

$$U = (V_R - V_L)/2 \sin\alpha \tag{27}$$
$$V = (V_R + V_L)/2 \cos\alpha \tag{28}$$
$$|V_s| = (U^2 + V^2)^{1/2} \tag{29}$$
$$\phi = -\arctan U/V \tag{30}$$

Equations (27)–(30) enable the vector velocity (U, V) or ($|V_s|$, $\phi$) to be deduced, based on the velocities ($V_L$, $V_R$) measured by the two sensors.

The optimum value of the setting angle $\alpha$ of the two sensors depends on various factors. The equation (27) indicates that the measured velocities $V_L$ and $V_R$ should have large enough difference in order for a small lateral velocity U to be measured without being obscured by error. This requires a large angle setting $\alpha$ of the sensors. On the other hand, the signal quality deteriorates for a larger angle, especially after 30 degrees. It has been found that the optimum angle is about 20 degrees, which gives the maximum sensitivity to the lateral velocity without causing serious deterioration in the signal quality.

Figure 4B:
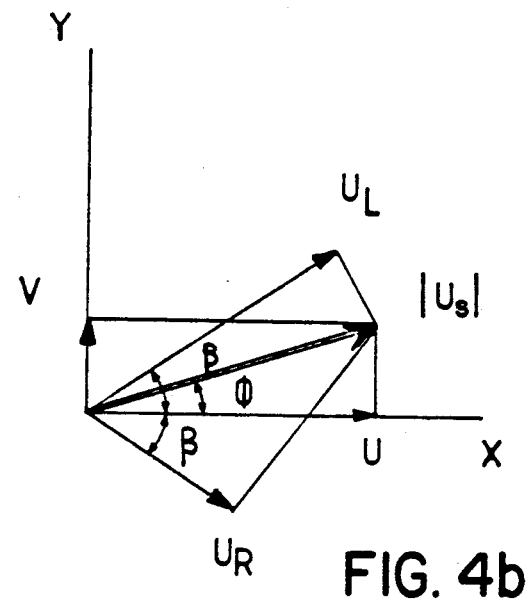

In a second arrangement as in FIG. 4b in which the vehicle moves approximately in the X direction at a speed $|U_s|$ at an angle $\phi$ with respect to the X axis, two sensors are placed at angles of plus and minus $\beta$ with respect to the X axis, instead of the Y axis. In this case, the velocities ($U_L$, $U_R$) along the orientations of the sensors are measured such that $$U_L = |U_s| \cos(\beta - \phi) \tag{31}$$

$$U_R = |U_s| \cos(\beta + \phi) \tag{32}$$

The velocities along the X and Y axes (U, V) are expressed as $$U = |U_s| \cos \phi \tag{33}$$

$$V = |U_s| \sin \phi \tag{34}$$

Combining equations (31)-(34) gives:

$$U = (U_L + U_R)/2 \cos \beta \quad (35)$$
$$V = (U_L - U_R)/2 \sin \beta \quad (36)$$
$$|U_s| = (U^2 + V^2)^{1/2} \quad (37)$$
$$\phi = \arctan U/V \quad (38)$$

Equations (35) and (36) enable the vector velocity (U, V) along the X and Y axes to be deduced based on the velocities ($U_L$, $U_R$) measured by the two sensors.

In a practical embodiment of the invention using four optical speed over ground sensors, the sensors are arranged as two pairs, with the sensors of each pair angled symmetrically about the vehicle longitudinal axis. Two possible arrangements are shown in FIGS. 5a and 5b.

Figure 5A:
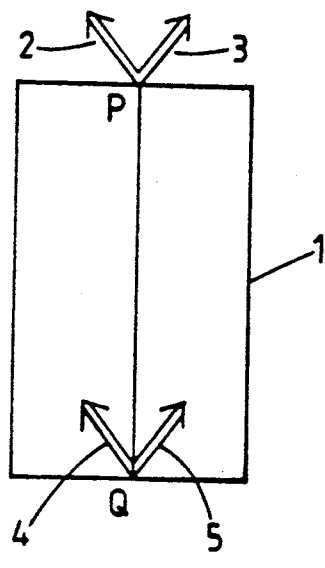

In FIG. 5a, P is the front centre whilst Q is the rear centre of the vehicle, which moves more or less in the Y direction. A first pair of sensors 2, 3 is arranged at angles of plus and minus a with respect to the Y axis at point P to measure velocities ($V_{L1}$, $V_{R1}$) and a second pair of sensors 4, 5 is similarly arranged at point Q to measure velocities ($V_{L2}$, $V_{R2}$). The measured values are transformed into ($U_1$, $V_1$) and ($U_2$, $V_2$) using equations (27) and (28) so that the previously described algorithm can be used for dead reckoning.

Figure 5B:
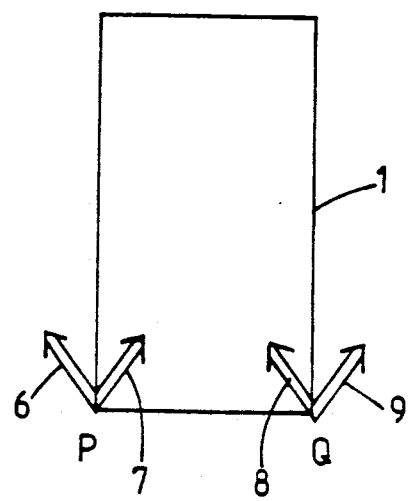

In FIG. 5b, P is the left rear corner and Q is the right rear corner of the vehicle which moves more or less in the X direction. A first pair of sensors 6, 7 is arranged at angles of plus and minus $\beta$ with respect to the X axis at point P to measure velocities ($U_{L1}$, $U_{R1}$) and a second pair of sensors 8, 9 is similarly arranged at point Q to measure velocities ($U_{L2}$, $U_{R2}$). The measured values are transformed into ($U_1$, $V_1$) and ($U_2$, $V_2$) using equations (35) and (36) so that the previously described algorithm can be used for dead reckoning.

As previously explained, it is sufficient to use only three sensors in order to determine vehicle speed and direction for dead reckoning purposes. However, because a single optical speed over ground sensor cannot provide lateral velocity sensing on its own, careful arrangement is necessary if only three sensors are to be used. Two possible arrangements are shown in FIGS. 6a and 6b.

In FIG. 6a, the point P is at the left rear corner and Q at the right rear corner of the vehicle 1. In this case, the vehicle moves more or less in the X direction. At point P, a pair of sensors 10, 11 is arranged at angles of plus and minus $\beta$ with respect to the X axis to measure ($U_{L1}$, $U_{R1}$) whilst at point Q a single sensor 12 is arranged along the X axis to measure $U_2$. Using equations (35), (36) and (18), all the values ($U_1$, $V_1$) and ($U_2$, $V_2$) necessary to perform the algorithm for dead reckoning are obtained. FIG. 6b shows a mirror image arrangement of the arrangement of FIG. 6a, with the pair of sensors 10, 11 at the point Q and the single sensor 12 at the point P. Otherwise, this arrangement is the same as that of FIG. 6a.

Instead of three optical speed over ground sensors, it is possible to use two such sensors 15, 16 and a rotation sensor such as a fibre optic gyroscope 17, two such arrangements are shown in FIGS. 7a and 7b.

In FIG. 7a, the vehicle moves more or less in the Y direction i.e. with the point P at the front centre and the point Q at the rear centre, and the optical sensors 15, 16 are arranged at angles of plus and minus a with respect to the Y axis at P to measure ($V_{L1}$, $V_{R1}$) (or at Q to measure ($V_{L2}$, $V_{R2}$)) in addition to the gyroscopic sensor 17 to measure ω. Equations (27), (28), (21) and (22) allow all the necessary values ($U_1$, $V_1$) and ($U_2$, $V_2$) for dead reckoning to be deduced.

In FIG. 7b, the vehicle moves more or less in the X direction, i.e. with the point P at the left rear corner and the point Q at the right rear corner, and the sensors 15, 16 are arranged at angles of plus and minus $\beta$ with respect to the X axis at P to measure ($U_{L1}$, $U_{R1}$) (or at Q to measure ($U_{L2}$, $U_{R2}$)) in addition to the sensor 17 to measure ω. Again, the equations (35), (36), (21) and (22) give all the necessary values for dead reckoning.

Figure 8:
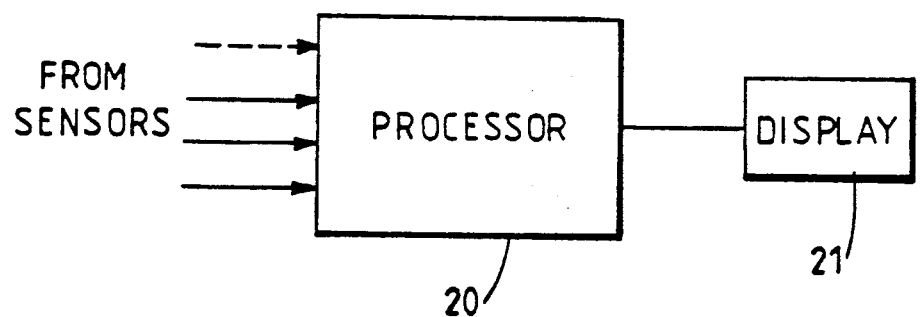
FIG. 8 is a block diagram of part of a route guidance system for use with the embodiments of FIGS. 5a to 7b.

FIG. 8 illustrates schematically a dead reckoning system for route guidance in a vehicle. The outputs from the sensors are supplied to a processor 20, which is preferably embodied by a microprocessor system, for instance including a data processor, input and output interfaces, read only memory containing software, and a random access memory. The processor may be programmed to receive the output signals from three sensors for use with arrangements employing three sensors, or from four sensors with arrangements employing four sensors, the fourth input being indicated by a broken line in FIG. 8. The output of the processor is connected to a display 21 which may take any suitable form for use in vehicle guidance. Such a system may operate in conjunction with map matching and/or communication with infrastructure facilities for position correction. For instance, the display may be an alpha numeric display providing output information in the form of text. Alternatively, the display may be any sort of graphic display for presenting route guidance information visually. Alternatively or additionally to the display 21, an audio output device such as a speech synthesizer may be provided for communicating the output information from the processor 20.

Figure 9:
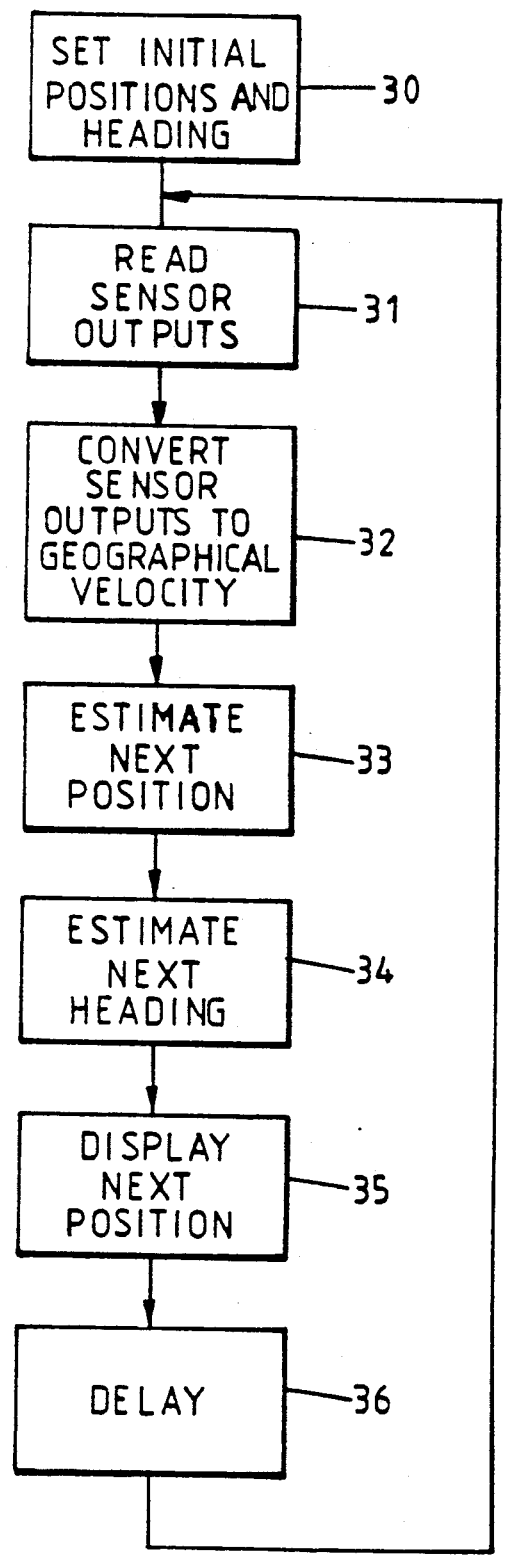
FIG. 9 is a flow chart illustrating operation of the system of FIG. 8.

FIG. 9 is a flow chart showing the functions performed by the processor 20 under software control. When the system is switched on, the initial position and heading are set at 30. This may be performed manually, for instance by entry from a keyboard. Alternatively, the processor 20 may have non-volatile memory for storing the last position during previous use of the system.

At 31, the processor reads the output signals from the sensors arranged in the vehicle, which output signals represent the vector velocity of the vehicle in terms of the coordinate system of the vehicle. At 32, the processor converts the output signals into the components of the velocity, for instance using equations (9) and (10), relative to the geographical coordinate system. At 33, the next position of the vehicle is estimated, for instance using equations (11) and (12). At 34, the processor estimates the next heading from the estimated next position, for instance using equations (13) to (15). The display 21 is then updated at 35 so as to display the next position. At 36 a delay is executed before returning to step 31. The steps 31 to 36 are repeated cyclically so that the display 21 is updated at regular time intervals to show the current position of the vehicle.

It is thus possible to provide a dead reckoning system as part of a vehicle guidance system which is highly accurate and which makes use of sensors which are substantially independent of the detailed vehicle operation. In particular, it is possible to avoid the use of sensors which respond to the rotation of vehicle wheels. Wheel sensors of this type require some modification of the vehicle and have limited accuracy. In particular, distance measurement depends on the rolling radius of the wheel and tire, which can vary depending on air pressure within the tire and temperature of the tire. Also, such sensors rely on constant contact between the tire and the ground, and are susceptible to errors caused by slipping or spinning wheels where contact with the ground is effectively lost. Magnetic compasses for indicating the vehicle heading are susceptible to stray magnetic fields and electrical interference, and thus tend to be unreliable. Although it is possible to screen such compasses from these effects, this increases the cost of such compasses and makes their use unattractive. The arrangements described hereinbefore suffer from none of these sources of error and the sensors can be attached at almost any convenient location under the vehicle or, in the case of fibre optic gyroscopes within the vehicle.

Figure 10:
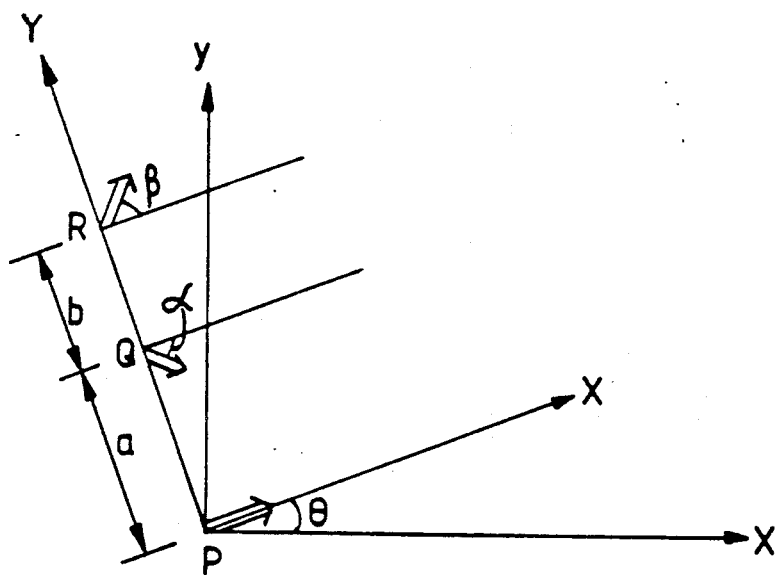
FIG. 10 illustrates use of three optical speed over ground sensors.

FIG. 10 illustrates the analysis for three mutually spaced speed over ground sensors with different orientations. Without any loss of generality, the sensors shown at P, Q and R are shown as lying on a straight line so as to simplify the following analysis. However, other arrangements of spaced sensors can equally well be used and the man skilled in the art would have no difficulty in performing the analysis.

As before, X and Y represent the vehicle co-ordinates with the vehicle being oriented along the X axis, and x and y represent the geographical co-ordinates. The sensor P is located at $(x_1, y_1)$ and measures speed $U_o$, the sensor Q is located at $(x_2, y_2)$ and measures speed $U_R$, and the sensor R is located at $(x_3, y_3)$ and measures speed $U_L$.

The following relationships exist for i=1, 2, 3:

$$U_i = (d/dt)(X_i)$$
$$V_i = (d/dt)(Y_i)$$
$$u_i = (d/dt)(x_i)$$
$$v_i = (d/dt)(y_i)$$
$$X_1 - X_2 = -a \sin \theta \quad (39)$$
$$y_1 - y_2 = a \cos \theta \quad (40)$$
$$X_2 - X_3 = -b \sin \theta \quad (41)$$
$$y_2 - y_3 = b \sin \theta \quad (42)$$
$$u_i = U_i \cos \theta - V_i \sin \theta \quad (43)$$
$$v_i = U_i \sin \theta + V_i \cos \theta \quad (44)$$

Measurement of $U_o$, $U_r$, and $U_L$ gives:

$$U_o = U_1 \quad (45)$$

$$U_R = U_2 \cos \alpha - V_2 \sin \alpha \quad (46)$$

$$U_L = U_3 \cos \beta + V_3 \sin \beta \quad (47)$$

Differentiating equations (39) to (42) and using equations (43) and (44) gives:

$$V_1 = V_2 \quad (48)$$

$$V_2 = V_3 \quad (49)$$

$$U_1 - U_2 = (a/b)(U_2 - U_3) \quad (50)$$

Equations (45) to (50) therefore provide six equations for the six unknowns $(U_i, V_i)$ (i=1, 2, 3) which can therefore be solved as follows:

$$U_1 = U_o$$

$$U_2 = (a\, U_L \sin \alpha + a\, U_R \sin \beta + b\, U_o \sin \alpha \cos \beta)/((a+b)\sin \alpha \cos \beta + a \cos \alpha \sin \beta)$$

$$U_3 = ((a+b)\, U_L \sin \alpha + (a+b)\, U_R \sin \beta - bU_o \cos \alpha \sin \beta)/((a+b)\sin \alpha \cos \beta + a \cos \alpha \sin \beta)$$

$$V_1 = V_2 = V_3 = (a\, U_L \cos \alpha + b\, U_o \cos \alpha \cos \beta - (a+b)\, U_R \cos \beta)/((a+b)\sin \alpha \cos \beta + a \cos \alpha \sin \beta)$$

By setting b=o, this analysis corresponds to the case where first and second sensors are located at a point and a third sensor is spaced from the pair. Further, setting $\alpha = \beta$ gives the case where the first and second sensors are arranged symmetrically.

I claim:

1. An apparatus for sensing a vector velocity of a point on a vehicle with respect to ground, comprising:
   first and second speed over ground sensors, each of which has a preferred sensing orientation and is sensitive to speed and direction of movement in said preferred sensing orientation, said first and second sensors being arranged at said point on said vehicle with said preferred sensing orientations being aligned in first and second axes, respectively, said first and second axes are non-parallel in a horizontal plane; and
   processing means, responsive to said first and second speed over ground sensors, for providing a vector velocity output.

2. An apparatus as claimed in claim 1, in which each of said first and second sensors comprises an optical speed over ground sensor.

3. An apparatus for sensing velocity and orientation of a vehicle with respect to ground, comprising:
   first and second speed over ground sensors and at least one vehicle movement sensor, each of said speed over ground sensor having a preferred sensing orientation and sensitive to speed and direction of movement in said preferred sensing orientation, said first and second speed over ground sensors being arranged on the vehicle with said preferred sensing orientations being aligned in first and second axes, respectively, said first and second axes are non-parallel in a horizontal plane; and
   processing means, responsive to said first and second speed over ground sensors and said at least one vehicle movement sensor, for providing a vector velocity and orientation of the vehicle output.

4. An apparatus as claimed in claim 3, in which said first and second speed over grounds sensors comprise first and second optical speed over ground sensors.

5. An apparatus as claimed in claim 3, in which said at least one movement sensor comprises a vehicle rotation sensor responsive to rotation in a plane containing said first and second axes.

6. An apparatus as claimed in claim 4, in which said at least one further sensor comprises a third optical speed over ground sensor.

7. An apparatus as claimed in claim 4, in which the vehicle has a longitudinal axis and said first and second optical speed over ground sensors are located adjacent each other with said preferred sensing orientations thereof aligned at respective acute angles on either side of the longitudinal axis.

8. An apparatus as claimed in claim 7, in which said at least one further vehicle movement sensor comprises third and fourth optical speed over ground sensors, each of which has a preferred sensing orientation and is sensitive to speed and direction of movement in said preferred sensing orientation, said third and fourth optical speed over ground sensors being located adjacent each other with said preferred sensing orientations thereof aligned at further respective acute angles on either side of the longitudinal axis.

9. An apparatus as claimed in claim 8, in which each of said acute angles and said further acute angles is substantially equal to 20°.

10. A dead reckoning system for a vehicle, comprising:

first and second vehicle movement sensors, at least one further vehicle movement sensor, and processing means, said first and second vehicle movement sensors comprising first and second speed over ground sensors, each of which has a preferred sensing orientation and produces an output signal representing speed and direction of movement in said preferred sensing orientation, said first and second speed over ground sensors being arranged on the vehicle with said preferred sensing orientations being aligned in first and second axes, respectively, said first and second axes are non-parallel in a horizontal plane, said at least one further vehicle movement sensor producing an output signal representing vehicle movement, said processing means providing a sequence of estimated positions of the vehicle each consecutive pair of which is separated by a predetermined time interval, said processing means estimating each estimated position of said sequence from a preceding estimated position of said sequence, from said predetermined time interval, from said output signals of said first and second speed over ground sensors, and from said output signal of said at least one further vehicle movement sensor.

* * * * *

UNITED STATES PATENT AND TRADEMARK OFFICE
CERTIFICATE OF CORRECTION

PATENT NO. : 5,075,864
DATED : December 24, 1991
INVENTOR(S) : Izumi SAKAI

It is certified that error appears in the above-identified patent and that said Letters Patent is hereby corrected as shown below:

Item [30] on the title page of the above patent, the first priority number should read --8823179-- and not 8813179.

Signed and Sealed this

Twenty-third Day of March, 1993

Attest:

STEPHEN G. KUNIN

*Attesting Officer*     Acting Commissioner of Patents and Trademarks